United States Patent [19]

Harris

[11] Patent Number: 5,062,672

[45] Date of Patent: Nov. 5, 1991

[54] COPY MACHINE REMOVER OF PAPER CLIPS AND STAPLES

[76] Inventor: James I. Harris, 440 W. 47th St. #5-F, New York, N.Y. 10036

[21] Appl. No.: 626,731

[22] Filed: Dec. 13, 1990

[51] Int. Cl.[5] ............................................ B25J 15/06

[52] U.S. Cl. ................................ 294/65.5; 15/104 R; 15/106; 15/160; 294/2

[58] Field of Search ................ 294/2, 24, 65.5; 7/901; 15/104 R, 105, 105.52, 106, 111, 143 R, 159 R, 160, 171, 220 A, DIG. 4; 209/215; 269/8; 335/285, 286, 291-294, 302, 303

[56] References Cited

U.S. PATENT DOCUMENTS

| | | | |
|---|---|---|---|
| 2,390,339 | 12/1945 | Ullman et al. | 294/65.5 |
| 2,415,730 | 2/1947 | Davis | 15/104 R |
| 2,417,762 | 3/1947 | Koller | 294/65.5 |
| 2,547,990 | 4/1951 | Willms | 294/65.5 |
| 2,690,617 | 10/1954 | Giern et al. | 294/65.5 X |
| 2,732,243 | 1/1956 | Mount | 294/65.5 |
| 2,993,723 | 7/1961 | Twachtman et al. | 294/65.5 |
| 3,039,435 | 6/1962 | Meyer | 15/143 R X |
| 3,169,791 | 2/1965 | Twachtman | 294/65.5 |
| 3,186,765 | 6/1965 | Gentoso | 15/160 X |
| 3,228,720 | 1/1966 | Jordan | 294/65.5 |
| 3,297,352 | 1/1967 | Larrison et al. | 294/65.5 |
| 3,377,641 | 4/1968 | McGregor | 294/65.5 X |
| 3,384,408 | 5/1968 | Furzey | 294/65.5 |
| 3,425,468 | 2/1969 | Soucy | 294/65.5 X |
| 3,684,288 | 8/1972 | Grace | 294/65.5 X |
| 3,789,336 | 1/1974 | Gordin | 294/65.5 X |
| 4,178,029 | 12/1979 | LaPan | 294/65.5 |
| 4,813,729 | 3/1989 | Speckhart | 294/65.5 |

FOREIGN PATENT DOCUMENTS

| | | | |
|---|---|---|---|
| 817107 | 7/1959 | United Kingdom | 294/65.5 |

*Primary Examiner*—Johnny D. Cherry
*Attorney, Agent, or Firm*—William T. Hough

[57] ABSTRACT

A copy machine paperclip and staple retrieval device with a rigid longitudinally-extending elongated member having a cross-sectional area extending transversely across its longitudinal axis with its cross-sectional area diminished toward its distal end, a permanent magnet having a transverse cross-sectional area smaller than the member's distal end's cross-sectional area, and a cap member of compressible composition with an inner space having the permanent magnet received and seated therein after insertion through the cap's open upper end, and the open end size having the distal end received therein with the compressible composition compressibly secured onto the distal end, the cap member having a small cap cross-sectional area, with the bottom end having an outer surface substantially columnar with a blunt outer bottom surface having rounded edges, the cap member being columnar in shape, the cap's top open end having an inner circular surface, the elongated member at its diminished cross-sectional area being substantially conical in shape toward and at the distal end, the cap member at the inner circular surface being compressibly mounted on the conically shaped distal end, and a brush mounted on the distal end with bristles positioned in a fan shape extending substantially radially outwardly from the distal end in a direction away from the proximal end, the cap member being embedded within the bristles.

19 Claims, 4 Drawing Sheets

FIG. 1
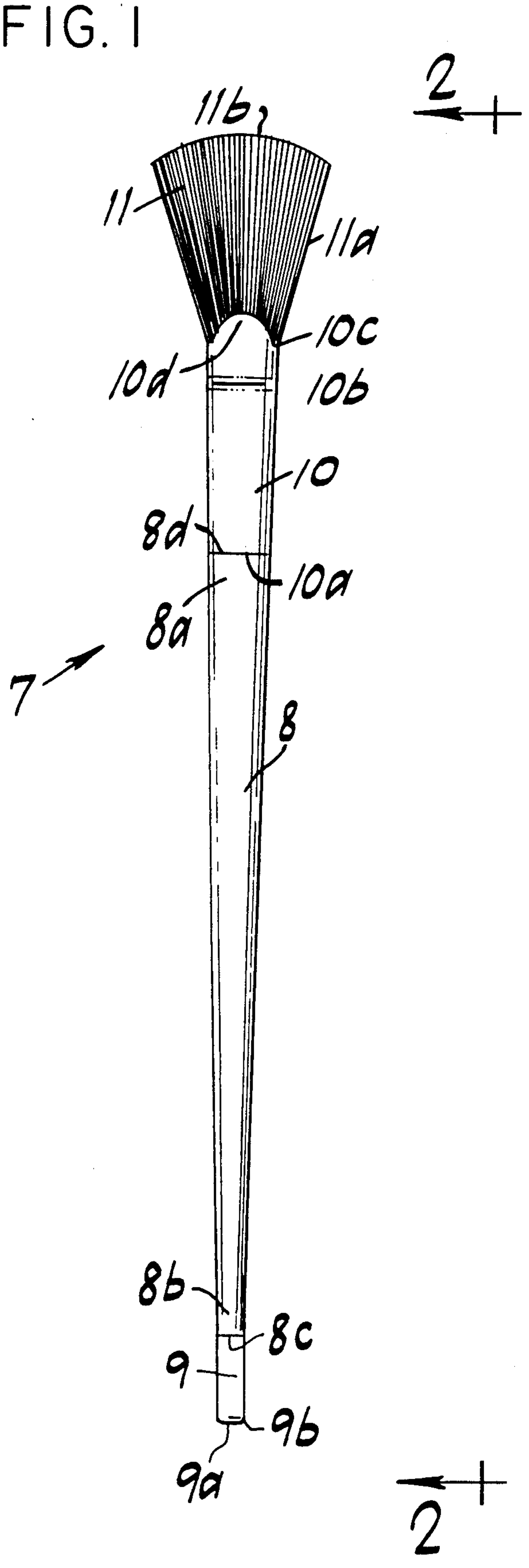
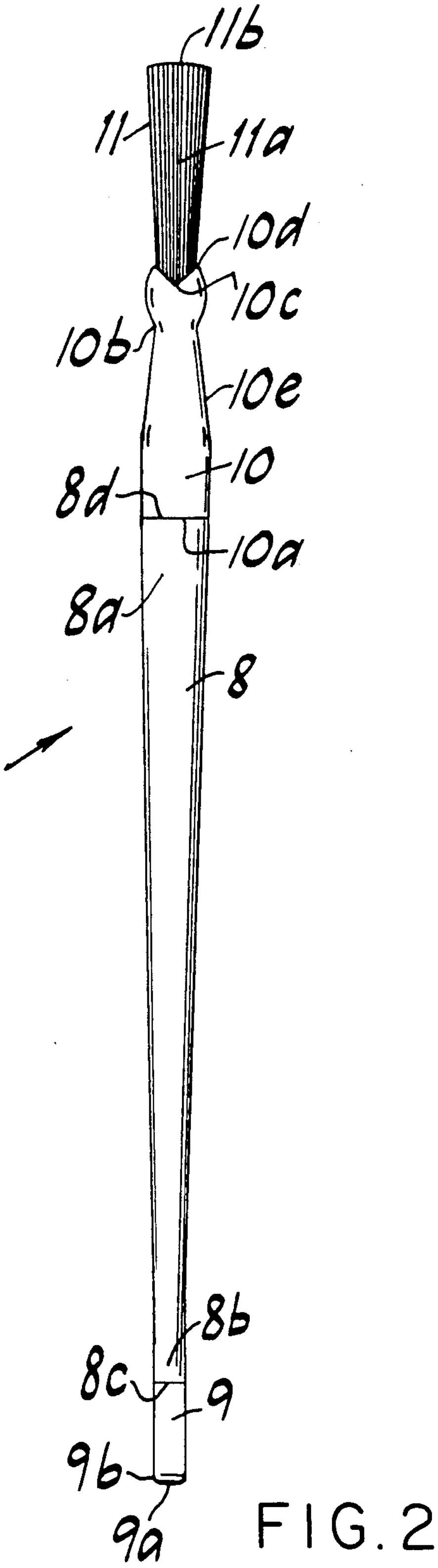
FIG. 2

FIG. 4
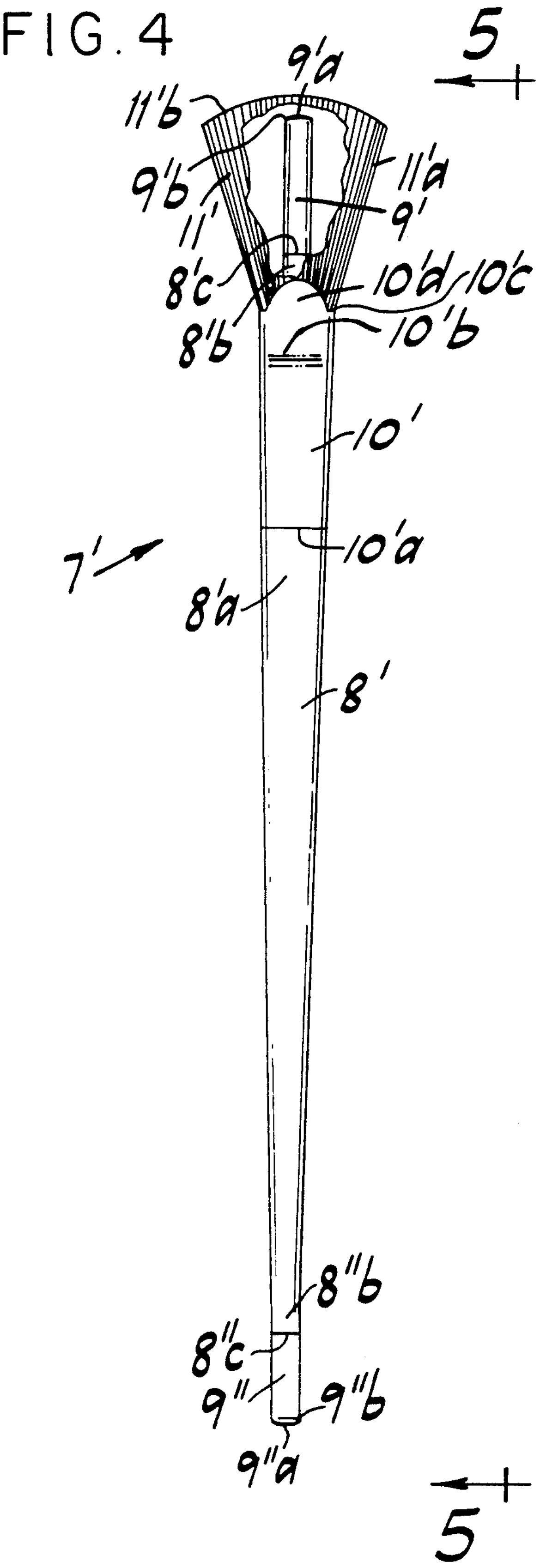
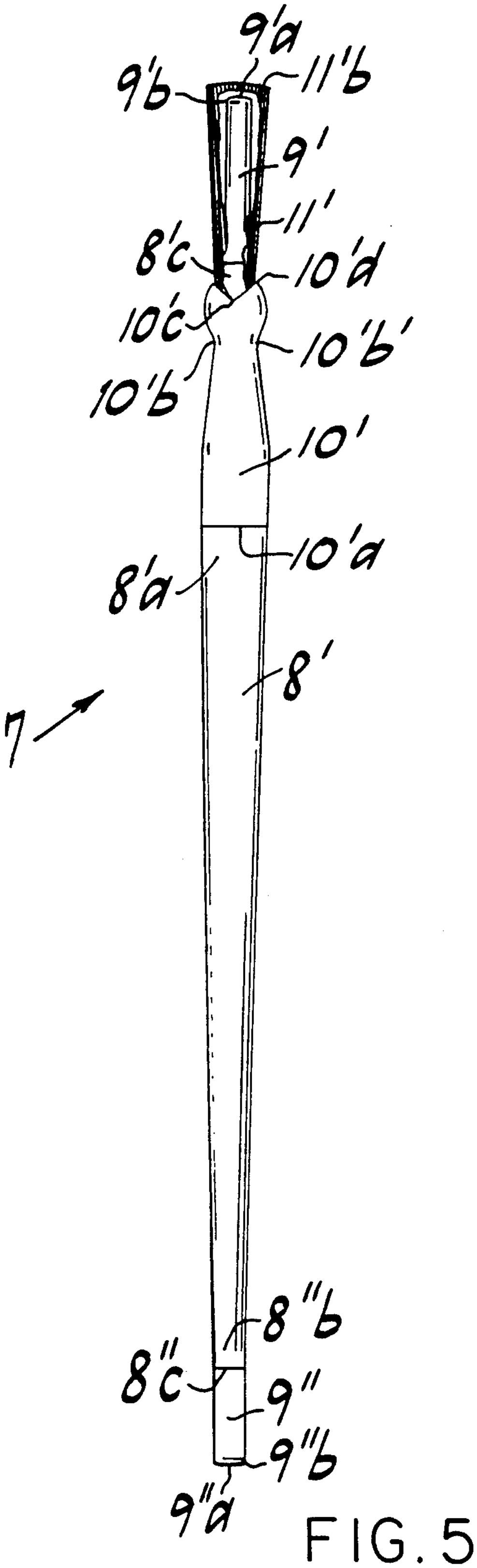
FIG. 5

COPY MACHINE REMOVER OF PAPER CLIPS AND STAPLES

This invention relates to a novel device for dislodgment and withdrawal from between inner works or parts of a copying machine, paperclips, staples and the like that have fallen into normally inaccessible areas or areas of sensitive or soft surfaces. For this invention, Disclosure Document No. 226892 was filed thereon into the United States Patent & Trademark Office on May 15, 1989 under the title Utility Brush with Magnetic Wand.

PRIOR ART

With regard to the specific needs and requirements to which the present invention is directed and fulfills, no relevant prior art is known nor located in novelty searches including the United States Patent Office patent search class 7 at subclass 901, class 15 at subclass 104, 110, 159, 160, 167.1 and 236.02, and class 294 at subclass 65.5. Patents located of mere interest include the following: U.S. Pat. No. 3,789,336 issued Jan. 29, 1974 to Gordin, discloses an extendable and retractable magnet-holder of which the distal end portion holding the magnet has almost the same large transverse cross-sectional area and shape as the upper handle portion within which the magnet retracts, and the magnet holder at the lower distal end has sharp corners, as well as being of complicated construction that clearly would be expensive to manufacture. U.S. Pat. No. 4,813,729 issued Mar. 21, 1989 to Speckhart, discloses a retractable tool of complicated mechanism with an enlarged bottom having sharp corners, and clearly expensive to manufacture. U.S. Pat. No. 2,993,723 has a bendable handle-shaft with an enlarged lower distal end and the magnet-holding structure being even larger, and the transverse cross-sectional area of the magnet casing being larger than the handle and flexible shaft thereof and including protruding ends of a pin or rivet. U.S. Pat. No. 3,425,468 issued Feb. 4, 1969 to Soucy discloses a hammer having its proximal enlarged end with a screw-mounted cap-attachment enveloping a very large magnet mounted thereon. Likewise, the U.S. Pat. No. 3,228,720 issued on Jan. 11, 1966 to Jordan has a handle end-enveloping member carrying a magnet, mounted on the enlarged proximal end of a hammer. U.S. Pat. No. 3,186,765 issued June 1, 1965 to Gentoso discloses fan shaped brush bristles with a large and flared bristle holder of a size wider than its brush handle. None of these patents disclose nor teach the present invention.

BACKGROUND TO THE INVENTION

The present invention was conceived after the inventor observed the use of copier machines by general office personnel. It was noticed that users were generally very careless with the way in which staples and paper clips were discarded around the copier machines. Frequently, staples and paper clips would be allowed to remain on the machines and would engage themselves into the cracks and crevices of the machine(s) as a result of everyday use of the machine(s) because of machine vibrations, being dragged by paper handling, and the like. Metallic members such as staples and paper clips, for example, can cause serious and expensive damage and/or shut-downs to the machines, such as scratching the copier glass, damage to the copier belt or drums, and/or damage to the intricate electrical circuits and wiring thereof.

The inventor noted office workers at various times attempting to retrieve the harmful or dangerous objects using pencils, pens and/or other sharp objects which themselves could cause irreparable and/or serious damage to the machines and/or parts thereof. Such efforts normally and usually were futile and unsuccessful, the metallic objects usually being stuck in a crack and crevice totally inaccessible by use of crude instruments such as writing pens and pencils and screw drivers in efforts to merely drag the object to some other location hopefully less threatening and/or damaging.

The inventor thereupon began exploring ways to perform such recovery task by a safer and more successful and less potentially damaging route, by considering and trying alternative novel recovery instruments. While a long magnetic rod or screwdriver mounting a magnet were considered, problems of too large and/or too powerful a magnet and/or difficulties of mounting the same as to remain sufficiently small as to be accessible to such above-noted metallic objects and to involve secure mounting and to avoid high cost of production and resulting high sales prices thwarted such approaches.

Moreover, a mere magnetized screwdriver would inevitably result in damage to copier machine sensitive parts and/or surfaces as a result of hazardous use of the sharp-edged screwdriver blade, as well as such sharp blade if magnetized, not being sufficiently conductive as to effectively engage and drag such lodged or jammed metallic objects from the machine(s).

Another unsuccessful option considered and tried was the mounting of a magnet onto a brush handle typically like a paint brush and its handle. Two or more problems arose, such as difficulty and lack of success in the mounting of a magnet efficiently and securely to such type handle, and typical magnets having abrasive edges that themselves would be hazardous as to potential damage to the above-noted sensitive and/or dangerous parts or elements of the copier machine, as well as being too bulky to fit easily in the required cracks and crevices of the machines. The potential overcoming of the above-noted problems with such approaches involved prohibitive expense that would render the sales price completely unrealistic and unsatisfactory commercially.

Thus, a notorious problem encountered by users of office copying machines preparatory to copying papers held together with staples and/or paperclips, is the careless placing of removed staples and paperclips which too frequently fall into the inner works of the copying machine with resulting jamming and/or marring of soft or sensitive surfaces, drums, wheels or the like. Resulting from such notorious accidents, are ruined drums, jammed wheels and/or chains and/or belts or the destruction thereof, together with shut-down time. Frequently, such paperclips or removed staples have fallen into inaccessible locations, but which if removed promptly and/or easily could prevent expensive shut-down time-delays and/or damage to the copier inner works. Similar problems occur with mechanical and electrical typewriters, and with computer or word-processor key boards. Heretofore, no adequate nor suitable simple and/or inexpensive device or equipment has existed for preventative maintenance such as the making possible easy and prompt removal of paperclips and/or staples that have fallen into inaccessible locations prior to their causing major and/or irreparable damage or injury to soft and/or sensitive inner parts of the copier machine or the like. Also, frequently the inaccessible locations are very small or have narrow space between or adjacent inner parts, preventing large and/or cumbersome tools or pliers or tweezers or the like from being utilized successfully in the limited-dimension space available. Magnetic tools of the type represented by the above-noted prior art provide typically too large and cumbersome tools, as well as having sharp corners and/or edges which like a screw driver readily could result in major damage to revolving rolls, drums, gears, wheels and/or belts thereon that support and carry the paper within the copy machine works. Likewise, mere brushes heretofore have achieved little to remedy the problems above-noted, a brush alone carrying the hazard of merely pushing the paperclip or open staple into a less susceptable location and/or causing it to become more tightly lodged. Also, for distant inaccessible locations of fallen metallic objects such typically as nuts, screws, paperclip, open staples and the like, short and/or large bodied tools fail to provide any viable possibilities for successful and/or easy removal by the unexperienced typical mere user of a copying machine. Also, prior existing instruments, including also pliers with elongated clamping ends, require maneuvering space for the tool as well as for the hand, normally also the presence of the hand in operation thereof blocking the view of the object to be removed. With prior devices there exists the further hazard of the end thereof becoming lodged among inner parts and/or pulling-off or breaking-off within the machine, thereby adding further complications.

OBJECTS OF THE INVENTION

Accordingly, objects of the invention include the overcoming and/or avoiding of difficulties and problems and disadvantages discussed above, together with the obtaining of novel benefits.

Another object is to obtain a novel tool requiring minimal skill and/or expertise for successful use thereof in the engagement and withdrawal of miscellaneous metallic debris such as paperclips, open staples or the like, from inner works of machines such as copiers, computer keyboards, typewriters and the like.

Another object is to obtain a tool having novel shape and construction adaptable to be maneuverable and securable within small and/or cramped spaces of inner works of copiers, computers, computer keyboards, typewriters and the like.

Another object is to obtain a tool having one or more above-noted objects, together with simple and inexpensive construction and/or components whereby cost to the public is nominal and minimal.

Another object is to obtain a tool having separate but coordinated and interrelated functions rendering one thereof more effective by the coordinated and/or simultaneous use in dislodgment, moving and/or attracting and/or attachment to and removal of metallic debris from copying machines, typewriters, keyboards, and/or inner-works thereof, and the like.

Other objects become apparent from the preceding and/or following disclosure.

Objects of the invention are obtained by the invention as disclosed herein.

BROAD DESCRIPTION

Broadly, the invention may be described as a copy machine paperclip and staple retrieval device in the nature of a combination. There are included a substantially rigid axially elongated member, a permanent magnet and a cap member. The elongated member is elongated along a longitudinal axis thereof having opposite proximal and distal ends thereof, the elongated member having a first cross-sectional area extending transversely across the longitudinal axis and the cross-sectional area being diminished toward the distal end, a permanent magnet having a transverse second cross-sectional area smaller than the first cross-sectional area of the distal end, and a cap member having a bottom end and a top open end and having an inner space in through-communication with the top open end and of a size and shape having the permanent magnet seated within the inner space, and the open end being of a size having the distal end received therein and the cap being secured onto the distal end, the cap member mounted thereon having a sufficiently small third cross-sectional area as to be maneuverable within small spaces between copy machine inner parts whereby metallic debris is accessible to be attracted and held by the permanent magnet to and removed by withdrawal of the elongated member.

In a first preferred embodiment as an improvement on the broad invention, the bottom end has an outer surface substantially columnar in shape. The bottom end has a substantially blunt outer bottom surface. The circumscribing edges of the bottom surface have rounded edges such that no sharp corners or sharp edges exist thereby being devoid of danger of scratching or marring sensitive or soft surfaces of copy machine inner parts.

In a second preferred embodiment as an improvement on the first embodiment, the cap member has an outer surface columnar in shape continuous with the above-noted blunt outer bottom surface. In this preferred embodiment, the top open end has an inner circular surface, and the elongated member at the diminished cross-sectional area is substantially frusto-conical in a narrowing shape in a direction toward and at the distal end. The cap member at the inner circular surface is mounted on the distal end. As a result thereof, small spaces in which metallic debris is lodged are more accessible for magnetically attracting metallic debris to the cap for holding by the permanent magnet. This enables improved removal of the metallic debris by insertion of the elongated member between and withdrawal from copy machine inner parts.

In a third preferred embodiment as an improvement on the second preferred embodiment, there is included a brush mounted on the distal end. The brush is mounted such that its bristles are positioned in substantially a fan shape extending substantially radially outwardly from the distal end in a direction away from the proximal end. The cap member is embedded within the bristles. Thereby, the bristles are adapted to reach into small spaces beyond the bottom end to facilitate dislodgment of metallic debris from between copy machine inner parts by attraction and attachment by magnetic action of the permanent magnet.

In a fourth preferred embodiment as an improvement on the third preferred embodiment, the cap member is composed of compressible composition and is compressibly secured onto the distal end.

In a fifth preferred embodiment as an improvement on the fourth preferred embodiment, the bottom end is closed, preventing the possibility of accidental disengagement of the magnet or loss thereof within the apparatus or parts in which the paperclip or the like is dropped or lodged.

In a sixth preferred embodiment as an improvement on the fifth preferred embodiment, a brush is mounted on the proximal end. Bristles are positioned in a fan shape extending substantially radially outwardly from the proximal end in a direction away from the distal end. Such fan shape and positioning of the bristles make it possible for the bristles to reach into small spaces beyond reach of the bottom end of the elongated member, thereby facilitating ease and success in dislodgment of metallic debris from between copy machine inner parts for attraction and attachment to the cap member by magnetic action of the permanent magnet.

In a seventh preferred embodiment as an improvement on the broad embodiment as initially described, the bottom end is closed as described in the preceding fifth preferred embodiment.

In an eighth preferred embodiment as an improvement on the broad invention initially described, there is included an improvement as above described in the second preferred embodiment.

In a ninth preferred embodiment as an improvement on the broad invention as initially described, there is included an improvement as above described in the third preferred embodiment.

In a tenth preferred embodiment as an improvement on the broad invention as initially described, there is included an improvement as above described in the fourth preferred embodiment.

In an eleventh preferred embodiment as an improvement on the broad invention as initially described, there is included an improvement as above described in the seventh preferred embodiment.

For one or more of the preceding preferred embodiments, more preferably the dimensions are as follow.

The combined length of the brush, magnet and handle as a composite is of and most suitable for an average-sized hand. The handle shape is optimal or ideal size for fitting into the typical or average exterior cracks and crevices of copier machine(s). Typically, the magnetic tip is a cap of thin sheet of metal or plastic forming an inner space, the cap being of a size as dictated by the necessity that magnetism of the encased magnet have at-least the minimum required magnetic power (magnetism), noting also that a larger size or using a larger handle-end for the mounting thereof would result in too diminished magnetic power to fulfill the objects of this invention. Also, for a larger size, normally a larger handle end would be required and such larger handle end would be too large for purposes of this invention with regard to the limited small size(s) of above-noted cracks and crevices and inner spaces and locations from which typically staples and/or paper clips must be retrieved. The length of the magnet-containing cap typically has an optimal length necessary for more preferred results for the same reasons as to critically as above-stated with regard to the minimum and maximum magnetism and size of magnet essential. Interior width of the magnet-mounting cap is also important for optimal preferred results for the same reasons above-stated with regard to required magnetism. The brush handle at its mounting tip is reduced in size at the cap mounting end of the handle, fitting snugly (tightly) into the cap, and being further anchored by the presence of a very thin layer of adhesive of conventional or desired type. Likewise, such adhesive is utilized to stably and immovably anchor the permanent magnet that has critical thickness (height) to the extent of having adequate magnetism, depending upon the strength of the magnet. A magnet of too small a size would not provide the critically necessary magnetism to achieve the inventive objects, and a magnet significantly larger would require a larger cap, again to defeat the objects of the invention for reasons already above-discussed, as well as being too heavy, too large and cumbersome for the small working space for its intended use.

As above-noted, the magnet-containing cap at its terminal end is preferably flat with rounded edges. Terminal flat surface dimensions too small would be normally of insufficient size as to effectively provide sufficient area onto which the staple, paper clip or the like may be anchored, and dimensions of too large would interfere with the intended use by reason of limited working space in areas of intended use. As a border thereto, there are the rounded edges, critically necessary mo obviate scratching, scarring and/or otherwise mutilating the sensitive surfaces above-discussed within copier machines and the like.

It is noted that the conical cylindrical shape gives the brush handle greater strength and permits easier mounting and assembly thereby holding-down costs and resulting sales price within permissibly acceptable commercial limits. The part of the handle which connects to the ferrule narrows slightly in order to facilitate a secure fit of the ferrule to the handle. Bristle length less than an inch is not long enough to reach existing tight and/or otherwise inaccessible areas of the copier machine(s) at locations to which such metal objects typically fall. Conversely, a length greater than two inches normally does not permit sufficient nor adequate control of the brush-bristles to an extent necessary for successful retrieval of items and debris from such above-noted tight areas or otherwise inaccessible locations. Bristles of more than about two inches normally would be too harsh for the sensitive copier glass, and most likely would result in a scratching and thereby destructive marring of sensitive and expensive surface(s). Therefore, the foregoing dimensions are critical for reasons herein stated.

Likewise, the ferrule typically is of a length such that optimally more preferably the bristles of the brush may be adequately secured while also providing adequate space to secure the handle on the opposite end of the ferrule. The ferrule preferably also has the same conical-cylindrical shape as the brush; however, at the tip of the ferrule where the bristles attach to the ferrule, preferably the ferrule is slightly crimped in order to facilitate the attachment of the ferrule to the bristles.

The ferrule's thickness (widest portion) should be optimally of a thickness permitting the brush to be light in weight and thereby easy to maneuver.

The widest portion of the brush handle preferably is about one centimeter in diameter or thickness and decreases toward the position of the magnetic tip or mount, the brush handle being typically and preferably slightly wider or thicker in the mid-portion of its length to thereby enhance the handling thereof in the maneuvering of the bristles and/or magnetic tip or end portion to and/or within crack and/or limited spaces not readily accessible with the works of a copier machine, for example.

Accordingly, the device-combination in length in a preferred embodiment ranges from about 15 centimeters up to about 25 centimeters. The elongated member ranges from about 12 centimeters to about 15.3 centimeters in length. The elongated member at the distal end has a diameter ranging from 0.08 centimeters to about 0.13 centimeters. The cap member has a cap outer diameter from about 0.02 centimeter up to about 0.06 centimeter and has a cap inner diameter of from about 0.02 centimeters to about 0.045 centimeters. The cap member has a length ranging from about one centimeter to about two centimeters. The cap member has a side cylindrical wall of a thickness ranging from about 0.001 centimeter up to about 0.2 centimeter in thickness. The permanent magnet is substantially cylindrical in shape having an outer diameter substantially about the same as the cap outer diameter and the permanent magnet has a height of from about 0.05 centimeters to about one centimeter.

In a preferred embodiment, for mounting the brush bristles, a ferrule mounts the bristles on the proximal end with the bristles extending beyond the ferrule a distance ranging from about 2.5 centimeters to about 5 centimeters. The ferrule has a length ranging from about 0.5 centimeter to about 5 centimeters, and a width ranging up to about one centimeter.

In a more preferred and limited embodiment, the device-combination ranges from amount 20 centimeters up to amount 23 centimeters. The elongated member ranges from about 12 centimeters to about 15 centimeters in length, and at the distal end has a diameter ranging from about 0.89 centimeters to about 1.2 centimeters. The cap member has a cap outer diameter of from about 0.045 centimeter up to about 0.065 centimeter and has a cap inner diameter of from about 0.03 centimeters to about 0.05 centimeters, and a length ranging from about 0.7 centimeters to 1.25 centimeters. The cap member has a side cylindrical wall of a thickness ranging from about 0.005 centimeters up to about 0.1 centimeter in thickness. The permanent magnet is substantially cylindrical in shape having an outer diameter substantially the same as the cap inner diameter and the permanent magnet having a thickness of from about 0.1 centimeters to about 0.3 centimeter.

In a more limited preferred embodiment, the ferrule mounts the bristles on the proximal end with the bristles extending beyond the ferrule a distance ranging from about 3 centimeters to about 4 centimeters. The ferrule has a length ranging from about 1 centimeter to about 2 centimeters, and has a width ranging up to about one centimeter.

The invention may be better understood by making reference to the drawings of the following figures.

THE FIGURES

FIG. 1 diagrammatically illustrates a side view of a typical novel staple or paperclip retrieval device of this invention in an upright position.

FIG. 2 diagrammatically illustrates another side view as taken along line 2—2 of the FIG. 1 embodiment, in an upright position.

FIG. 3 diagrammatically illustrates an in-part view in enlargement with partial cut-away, in the same side view as in FIG. 1, illustrating the mounting structure of the cap and encapsulated magnet thereof.

FIG. 4 diagrammatically illustrates an alternate embodiment of the invention, in side view thereof, with partial cut-away of bristles revealing the magnet-containing cap embedded within the bristles of the brush of this embodiment, this alternate embodiment also illustrated in an upright position.

FIG. 5 diagrammatically illustrates another side view as taken along line 5—5 of FIG. 4 embodiment, in an upright position.

FIG. 6 diagrammatically illustrates an in-part view in enlargement with partial cut-away, in the same side view as in FIG. 4, illustrating the mounting structure of the cap and encapsulated magnet thereof as embedded within the bristles of the brush, also illustrated in an upright position.

FIG. 7 diagrammatically illustrates a cross-sectional view as taken along line 7—7 of FIG. 6.

FIG. 8 diagrammatically illustrates a cross-sectional view as taken along line 8—8 of FIG. 6.

FIG. 9 diagrammatically illustrates a cross-sectional view as taken along line 9—9 of FIG. 3.

FIG. 10 diagrammatically illustrates a cross-sectional view as taken along line 10—10 of FIG. 3.

DETAILED DESCRIPTION

Figure 3:
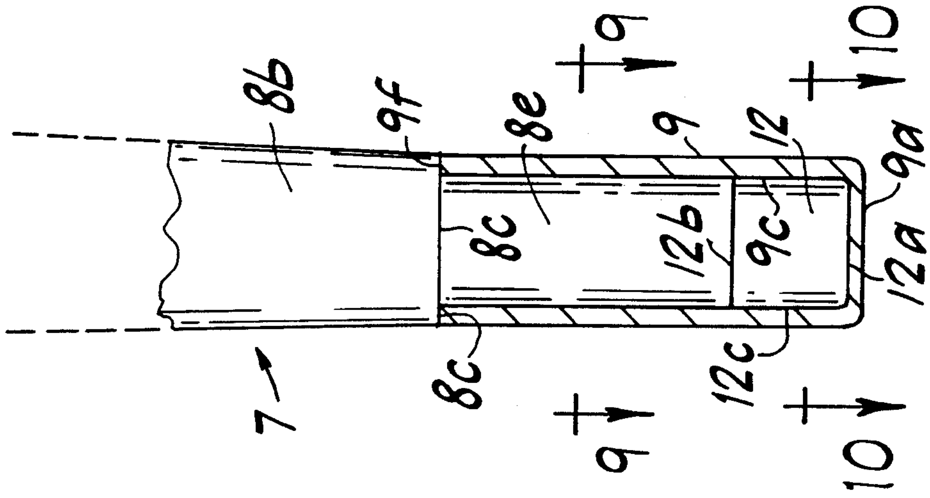

FIGS. 1 through 3, 7 and 8 illustrate one preferred embodiment of the invention, and FIGS. 4 through 6, 9 and 10 illustrate another preferred embodiment. The embodiment of FIGS. 4 through 6, 9 and 10 includes all features of the embodiment of FIGS. 1 through 3, 7 and 8, and for those feature and/or elements hereinafter described, related indicia are utilized for related and/or corresponding elements of the two embodiments. Accordingly, the embodiment of FIGS. 4 through 6, 9 and 10 will deal solely with the additional features. Once an element or feature has been described for one figure, description will not be repeated for other figure(s), except in some instances to improve clarity and ease of understanding.

In FIGS. 1 through 3, 7 and 8 there is shown the copy machine paperclip and staple retrieval device 7 broadly referred to by that indicia. The handle is generally referred to as the elongated member 8, having its upper proximal end 8*a* and its lower distal end 8*b*. At the lower distal end 8*b*, there is a downward step 8*c* to a lesser diameter that substantially corresponds to an inner diameter of the cylindrical wall of the cap 9. The cap 9 has its lower end flat surface 9*a*, and the rounded edges 9*b* that prevent the presence of any sharp corners or sharp edges. At the upper end of the handle 8, there is a second step 8*d* of reduced diameter, on which the metal brush-mounting member 10 is mounted at its open end 10*a*. The upper brush-mounting spaced-apart end-flanges 10*d* separated by recesses 10*c* on each of opposite sides of the brush-mounting member 10 are oval or semicircularly shaped as shown, with spaced-apart end-flanges pressed somewhat flatly together onto the bristles 11 therebetween—thereby locking (attaching) the lower ends of the bristles 11, the bristles 11 thereby becoming fan-shaped, with the convex arc 11*b* at the upper free-end of the bristles 11, being somewhat flattened at the opposite edges 11*a* of the brush formed by the bristles 11. A lower end of the bristles 11 are further locked by the pressed indentations 10*b* on each of opposite sides of the brush-mounting member 10. FIG. 2 illustrates the same features described for FIG. 1, except FIG. 2 shows a different side view as taken along line 2—2 of FIG. 1, accordingly better illustrating the shape of the brush bristles as seen in this view.

FIG. 3 illustrates in partial cross-section, the lower end of the embodiment of FIG. 1, in enlarged view, showing the same features. Additionally, FIG. 3 better illustrates the step 8*c* and the reduced-diameter of the lower, distal end of the handle, as reduced-diameter portion 8*e* on which the open end 9*f* of the cap 9 is mounted. Tightly (snugly) mounted within lower end interior space of the cap 9 is the magnet 12, adhered by adhesive 12*c* to cap inner surface 9*c*, illustrating the magnets lower face 12*a* and upper face 12*b*.

FIG. 4 illustrates additionally a handle cap-mounting structure 8′*b* with the upper proximal end 8′*b* of elongated member 8′ having a reduced-diameter step 8′*c* and a magnet-containing cap 9′ mounted within the bristles 11′, with the flat end 9′*a* and rounded edges 9′*b*, all shown in the partial cut-away of the bristles 11′. Otherwise, remaining members correspond to related members illustrated in FIG. 1, such as the bristles having the convex arc 11′*b* at the free-end 11′, and the somewhat flattened opposite edges 11′*a*, and the locking pressed indentations 10′*b* on each of opposite sides of the brush-mounting member 10′.

FIG. 5, for the side view along line 5—5 of FIG. 4, in another cut-away likewise shows the structure discussed for FIG. 4. FIG. 5 otherwise has the same features as those above-discussed for the embodiment of FIG. 4, being merely a different side view thereof.

Figure 6:
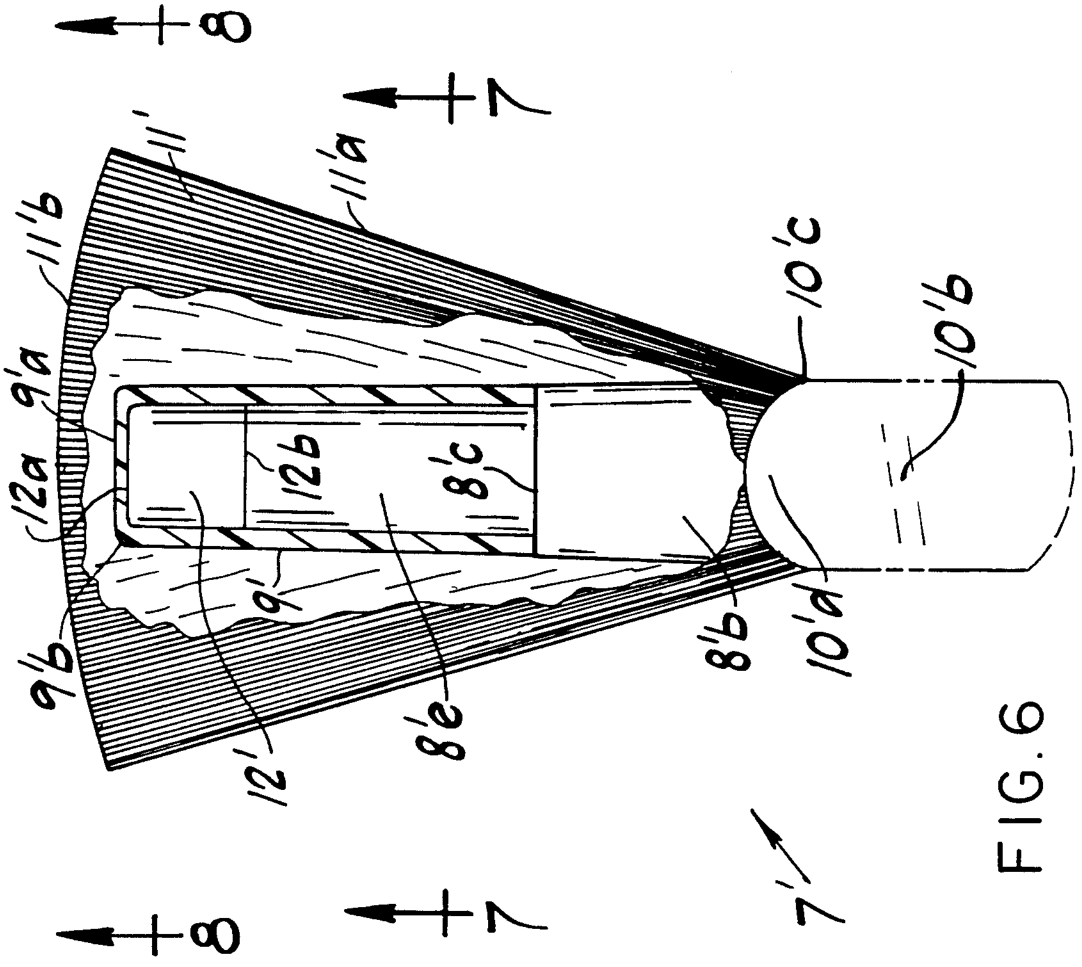

FIG. 6, in an enlarged view of the upper end of FIG. 4, with partial cross-section corresponding substantially to that shown in FIG. 3, shows the magnet 12′ mounted within the cap 9′ that is mounted on the upper hand portion 8′*e* of reduced diameter from the step 8′*c*. This being the same embodiment as above-described FIG. 4, other elements have been already described.

Figure 7:
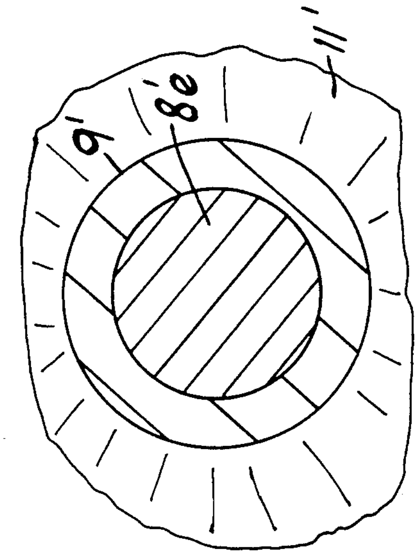
Figure 8:
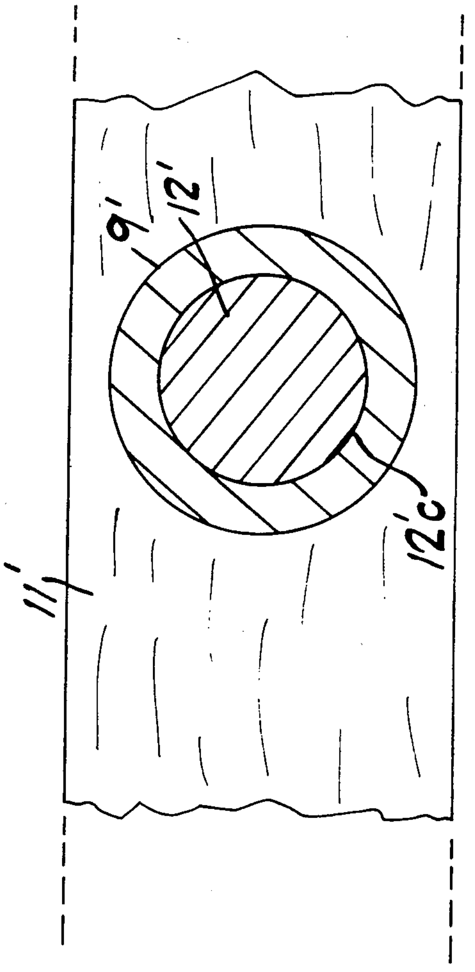

FIGS. 7 and 8 show views that substantially correspond to arrangements shown in above-described FIG. 6. Accordingly, the embodiments of FIGS. 7 and 8 as taken along lines 7—7 and 8—8 of FIG. 6, are the embodiment above-described for FIG. 4. The view of FIG. 7 along line 7—7 of FIG. 6 is thus through the upper hand portion 8′*e* which is the area of reduced diameter above the step 8′*c*, and the view being taken through surrounding bristles 11′ of FIGS. 4 and 6.

Figure 9:
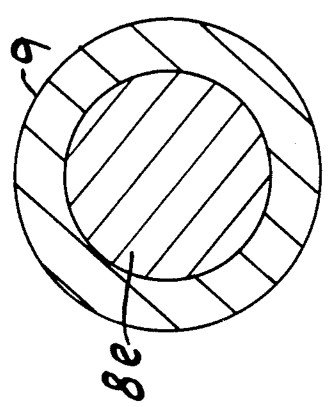
Figure 10:
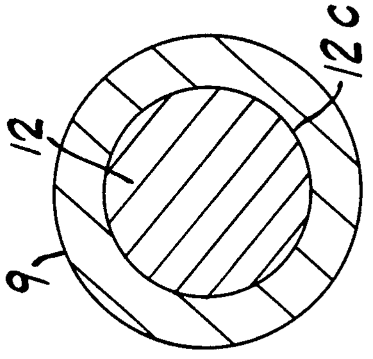

FIGS. 9 and 10 show views that substantially correspond to arrangements shown in above-described FIG. 3. Accordingly, the embodiments of FIGS. 9 and 10 as taken along lines 9—9 of FIG. 3 and 10—10 of FIG. 3, are thus through the distal end 8*b* of FIG. 3. The line 9—9 passes through the reduced-diameter portion 8*e* of each of FIGS. 9 and 3, and the line 10—10 passes through the magnet 12 of FIGS. 10 and 3. Each of FIGS. 9 and 10 shows in cross-section, the encasing sides of the cap 9.

It is within the scope and spirit of this invention to make such variations and modifications and substitution of equivalents as would be apparent to a person of ordinary skill in this art.

I claim:

1. A copy machine paperclip and staple retrieval device comprising as a combination: a substantially rigid axially elongated member elongated along a longitudinal axis thereof having opposite proximal and distal ends thereof, said elongated member having a first cross-sectional area extending transversely across said longitudinal axis in juxtaposition to said proximal end and the cross-sectional area of said elongated member diminishing from said first cross-sectional area to a diminished cross-sectional area at said distal end, a permanent magnet having a transverse second cross-sectional area smaller than said diminished cross-sectional area of said distal end, and a cap member having a bottom end and a top open end and having an inner space in through-communication with the top open end and of a size and shape having the permanent magnet seated within the inner space, and said open end being of a size having said distal end received therein and the cap member being secured onto said distal end, said cap member mounted thereon having a sufficiently small third cross-sectional area as to be maneuverable within small spaces between copy machine inner parts whereby metallic debris is accessible to be attracted and held by the permanent magnet to and removed by withdrawal of said elongated member, said bottom end having an outer side surface substantially columnar in shape with a substantially blunt outer bottom surface having rounded edges such that no sharp corners or sharp edges exist thereby being devoid of danger of scratching or marring sensitive or soft surfaces of copy machine inner parts.

2. A copy machine paperclip and staple retrieval device of claim 1, in which said bottom end is closed.

3. A copy machine paperclip and staple retrieval device of claim 1, in which said cap member has an outer surface columnar in shape continuous with said blunt outer bottom surface, in which said top open end has an inner circular surface, and in which said elongated member at said diminished cross-sectional area is substantially frusto-conical in shape toward and at said distal end, said cap member at said inner circular surface being compressibly mounted on said frusto-conically shaped distal end whereby small spaces in which metallic debris is lodged are accessible for magnetically attaching metallic debris to said cap member for holding by said permanent magnet thereby enabling removal of the metallic debris by insertion of the elongated member between and withdrawal from copy machine inner parts.

4. A copy machine paperclip and staple retrieval device of claim 1, including a brush mounted on the distal end with bristles positioned in a fan-shape extending substantially radially outwardly from the distal end in a direction away from said proximal end, said cap member being embedded within said bristles such that the bristles are adapted to reach into small spaces beyond the bottom end to facilitate dislodgment of metallic debris from between copy machine inner parts by attraction and attachment by magnetic action of the permanent magnet.

5. A copy machine paperclip and staple retrieval device of claim 1, including a brush mounted on the proximal end with bristles positioned in a fan-shape extending substantially radially outwardly from the proximal end in a direction away from said distal end such that the bristles are adapted to reach into small spaces beyond reach of the bottom end to facilitate dislodgment of metallic debris from between copy machine inner parts for attraction and attachment to the cap member by magnetic action of the permanent magnet.

6. A copy machine paperclip and staple retrieval device of claim 1, in which said cap member is composed of compressible composition and is compressibly secured onto said distal end.

7. A copy machine paperclip and staple retrieval device of claim 1, in which said combination in length ranges from about 15 centimeters up to about 25 centimeters, in which said elongated member ranges from about 12 centimeters to about 15.3 centimeters in length, in which said elongated member at said distal end having a diameter ranging from 0.08 centimeters to about 0.13 centimeters, said cap member having a cap outer diameter from about 0.02 centimeter up to about 0.06 centimeter and having a cap inner diameter of from about 0.02 centimeters to about 0.045 centimeters, said cap member having a length ranging from about one centimeter to about two centimeters, said cap member having a side cylindrical wall of a thickness ranging from about 0.001 centimeter up to about 0.2 centimeter in thickness, and in which said permanent magnet is substantially cylindrical in shape having an outer diameter substantially the same as said cap outer diameter and said permanent magnet having a height of from about 0.05 centimeters to about one centimeter.

8. A copy machine paperclip and staple retrieval device of claim 1, in which said combination in length ranges from about 20 centimeters up to about 23 centimeters, in which said elongated member ranges from about 12 centimeters to about 15 centimeters in length, in which said elongated member at said distal end having a diameter ranging from about 0.89 centimeters to about 1.2 centimeters, said cap member having a cap outer diameter of from about 0.045 centimeter up to about 0.065 centimeter and having a cap inner diameter of from about 0.03 centimeters to about 0.05 centimeters, said cap member having a length ranging from about 0.7 centimeters to 1.25 centimeters, said cap member having a side cylindrical wall of a thickness ranging from about 0.005 centimeters up to about 0.1 centimeter in thickness, and in which said permanent magnet is substantially cylindrical in shape having an outer diameter substantially the same as said cap inner diameter and said permanent magnet having a thickness of from about 0.1 centimeters to about 0.3 centimeter.

9. A copy machine paperclip and staple retrieval device comprising as a combination: a substantially rigid axially elongated member elongated along a longitudinal axis thereof having opposite proximal and distal ends thereof, said elongated member having a first cross-sectional area extending transversely across said longitudinal axis in juxtaposition to said proximal end and the cross-sectional area of said elongated member diminishing from said first cross-sectional area to a diminished cross-sectional area at said distal end, a permanent magnet having a transverse second cross-sectional area smaller than said diminished cross-sectional area of said distal end, and a cap member having a bottom end and a top open end and having an inner space in through-communication with the top open end and of a size and shaped having the permanent magnet seated within the inner space, and said open end being of a size having said distal end received therein and the cap member being secured onto said distal end, said cap member mounted thereon having a sufficiently small third cross-sectional area as to be maneuverable within small spaces between copy machine inner parts whereby metallic debris is accessible to be attracted and held by the permanent magnet to and removed by withdrawal of said elongated member, said bottom end having an outer side surface substantially columnar in shape with a substantially blunt outer bottom surface having rounded edges such that no sharp corners or sharp edges exist thereby being devoid of danger of scratching or marring sensitive or soft surfaces of copy machine inner parts, said cap member having said outer side surface being continuous with said blunt outer bottom surface, said top open end having an inner circular surface, and said elongated member at said diminished cross-sectional area being substantially frustoconical in a narrowing and tapering shape in a direction toward and at said distal end, said cap member at said inner circular surface being mounted on said distal end whereby small spaces in which metallic debris is lodged are accessible for magnetically attracting metallic debris to said cap member for holding by said permanent magnet thereby enabling removal of the metallic debris by insertion of the elongated member between and withdrawal from copy machine inner parts.

10. A copy machine paperclip and staple retrieval device of claim 9, including a brush mounted on the distal end with bristles positioned in a fan-shape extending substantially radially outwardly from the distal end in a direction away from said proximal end, said cap member being embedded within said bristles such that the bristles are adapted to reach into small spaces beyond the bottom end to facilitate dislodgment of metallic debris from between copy machine inner parts by attraction and attachment by magnetic action of the permanent magnet.

11. A copy machine paperclip and staple retrieval device of claim 10, in which said cap member is composed of compressible composition and is compressibly secured onto said distal end.

12. A copy machine paperclip and staple retrieval device of claim 11, in which said bottom end is closed.

13. A copy machine paperclip and staple retrieval device of claim 12, in which said combination in length ranges from about 15 centimeters up to about 25 centimeters, in which said elongated member ranges from about 12 centimeters to about 15.3 centimeters in length, in which said elongated member at said distal end having a diameter ranging from 0.08 centimeters to about 0.13 centimeters, said cap member having a cap outer diameter from about 0.02 centimeter up to about 0.06 centimeter and having a cap inner diameter of from about 0.02 centimeters to about 0.045 centimeters, said cap member having a length ranging from about one centimeter to about two centimeters, said cap member having a side cylindrical wall of a thickness ranging from about 0.001 centimeter up to about 0.2 centimeter in thickness, and in which said permanent magnet is substantially cylindrical in shape having an outer diameter substantially the same as said cap outer diameter and said permanent magnet having a height of from about 0.05 centimeters to about one centimeter.

14. A copy machine paperclip and staple retrieval device of claim 13, including a ferrule mounting said bristles on said distal end with said bristles extending beyond said ferrule a distance ranging from about 2.5 centimeters to about 5 centimeters, said ferrule having a length ranging from about 0.5 centimeter to about 5 centimeters, the ferrule having a width ranging up to about one centimeter.

15. A copy machine paperclip and staple retrieval device of claim 12, in which said combination in length ranges from about 20 centimeters up to about 23 centimeters, in which said elongated member ranges from about 12 centimeters to about 15 centimeters in length, in which said elongated member at said distal end having a diameter ranging from about 0.89 centimeters to about 1.2 centimeters, said cap member having a cap outer diameter of from about 0.045 centimeter up to about 0.065 centimeter and having a cap inner diameter of from about 0.03 centimeters to about 0.05 centimeters, said cap member having a length ranging from about 0.7 centimeters to 1.25 centimeters, said cap member having a side cylindrical wall of a thickness ranging from about 0.005 centimeters up to about 0.1 centimeter in thickness, and in which said permanent magnet is substantially cylindrical in shape having an outer diameter substantially the same as said cap inner diameter and said permanent magnet having a thickness of from about 0.1 centimeters to about 0.3 centimeter.

16. A copy machine paperclip and staple retrieval device of claim 15, including a ferrule mounting said bristles on said distal end with said bristles extending beyond said ferrule a distance ranging from about 3 centimeters to about 4 centimeters, said ferrule having a length ranging from about 1 centimeter to about 2 centimeters, the ferrule having a width ranging up to about one centimeter.

17. A copy machine paperclip and staple retrieval device of claim 10, including a ferrule mounting said bristles on said distal end with said bristles extending beyond said ferrule a distance ranging from about 2.5 centimeters to about 5 centimeters, said ferrule having a length ranging from about 0.5 centimeters to about 5 centimeters, the ferrule having a width ranging up to about one centimeter.

18. A copy machine paperclip and staple retrieval device of claim 10, including a ferrule mounting said bristles on said distal end with said bristles extending beyond said ferrule a distance ranging from about 3 centimeters to about 4 centimeters, said ferrule having a length ranging from about 1 centimeter to about 2 centimeters, the ferrule having a width ranging up to about one centimeter.

19. A copy machine paperclip and staple retrieval device of claim 9, including a brush mounted on the proximal end with bristles positioned in a fan shape extending substantially radially outwardly from the proximal end in a direction away from said distal end such that the bristles are adapted to reach into small spaces beyond reach of the bottom end to facilitate dislodgment of metallic debris from between copy machine inner parts for attraction and attachment to the cap member by magnetic action of the permanent magnet.

* * * * *